(12) United States Patent  
Carmichael et al.

(10) Patent No.: US 8,790,543 B2  
(45) Date of Patent: Jul. 29, 2014

(54) SCAVENGING OXYGEN (75) Inventors: Adrian John Carmichael, Liverpool (GB); Andrew Stuart Overend, Bolton (GB); Mark Rule, Roswell, GA (US); Ronald James Valus, Valley View, OH (US); Christine Leeming, Cheshire (GB); James Stuart Leeming, legal representative, Sale (GB)

(73) Assignee: Colormatrix Holdings, Inc., Wilmington, DE (US)

( * ) Notice: Subject to any disclaimer, the term of this patent is extended or adjusted under 35 U.S.C. 154(b) by 95 days.

(21) Appl. No.: 13/263,820

(22) PCT Filed: Apr. 8, 2010

(86) PCT No.: PCT/GB2010/050607  
§ 371 (c)(1),  
(2), (4) Date: Jan. 27, 2012

(87) PCT Pub. No.: WO2010/116192  
PCT Pub. Date: Oct. 14, 2010

(65) Prior Publication Data  
US 2012/0111757 A1    May 10, 2012

Related U.S. Application Data (60) Provisional application No. 61/167,919, filed on Apr. 9, 2009, provisional application No. 61/167,923, filed on Apr. 9, 2009, provisional application No. 61/222,143, filed on Jul. 1, 2009.

(51) Int. Cl.  
*C01B 3/06* (2006.01)  
*C01B 3/04* (2006.01)  
*C01B 6/04* (2006.01)  
*B65D 85/00* (2006.01)  
*B65D 51/00* (2006.01)  
*B29C 67/24* (2006.01)

(52) U.S. Cl.  
USPC ............... 252/188.28; 252/181.4; 252/181.7; 252/188.25; 252/188.26; 423/658.2; 429/426

(58) Field of Classification Search  
USPC ............... 252/181.4, 181.7, 188.25, 188.26, 252/188.28; 423/658.2; 429/429, 426  
See application file for complete search history.

(56) References Cited

U.S. PATENT DOCUMENTS 3,419,400 A    12/1968    Hayhurst et al.  
3,712,848 A    1/1973     Casey, Jr. et al.  
(Continued)

FOREIGN PATENT DOCUMENTS

EP    0066199 A2    12/1982  
EP    0328337 A1    8/1989  
(Continued)

OTHER PUBLICATIONS

European Search Report from EP 12 18 1561.  
(Continued)

*Primary Examiner* — Joseph D Anthony  
(74) *Attorney, Agent, or Firm* — Fay Sharpe LLP (57) ABSTRACT

A closure (40) for a container incorporates calcium hydride and a matrix material as a hydrogen-generating composition. In use, hydrogen is generated which reacts with oxygen permeating a container associated with the closure and a catalyst associated with the container catalyses reaction of the hydrogen and oxygen to produce water, thereby scavenging the oxygen. The composition of calcium hydride and matrix is also claimed.

20 Claims, 2 Drawing Sheets

(56) References Cited

U.S. PATENT DOCUMENTS

| | | | |
|---|---|---|---|
| 4,279,350 A | 7/1981 | King | |
| 5,330,687 A * | 7/1994 | Rieke | 260/665 R |
| 2010/0028499 A1* | 2/2010 | Rule et al. | 426/106 |
| 2010/0230636 A1* | 9/2010 | Hsueh et al. | 252/188.25 |
| 2011/0142754 A1* | 6/2011 | Ku et al. | 423/657 |
| 2011/0143240 A1* | 6/2011 | Hsueh et al. | 429/426 |
| 2012/0058046 A1* | 3/2012 | Sugimoto et al. | 423/657 |
| 2012/0114529 A1* | 5/2012 | Carmichael et al. | 422/105 |
| 2012/0118764 A1* | 5/2012 | Valus et al. | 206/213.1 |

FOREIGN PATENT DOCUMENTS

| | | |
|---|---|---|
| EP | 1 539 882 B1 | 10/2006 |
| GB | 1005651 | 9/1965 |
| GB | 1069929 | 5/1967 |
| GB | 1188170 | 4/1970 |
| WO | 9722469 | 6/1997 |
| WO | 9815966 | 4/1998 |
| WO | 9905922 | 11/1999 |
| WO | WO 2008/090354 * | 7/2008 |

OTHER PUBLICATIONS

European Search Report from EP 12 18 1527.
European Search Report from EP 12 18 1552.

* cited by examiner

SCAVENGING OXYGEN

CROSS REFERENCE TO RELATED APPLICATIONS

This application claims the benefit of U.S. Provisional Patent Application Ser. No. 61/167,919, filed 9 Apr. 2009, U.S. Provisional Patent Application Ser. No. 61/167,923, filed 9 Apr. 2009; and U.S. Provisional Patent Application Ser. No. 61/222,143, filed 1 Jul. 2009.

BACKGROUND

This invention relates to the scavenging of oxygen and particularly, although not exclusively, relates to the scavenging of oxygen in containers, for example food or beverage containers.

Polymers such as poly(ethylene terephthalate) (PET) are versatile materials that enjoy widespread use for fibres, films and three-dimensional structures. A particularly important application for polymers is for containers, especially for food and beverages. This application has seen enormous growth over the last 20 years, and continues to enjoy increasing popularity. Despite this growth, polymers have some fundamental limitations that restrict their applicability. One such limitation is that all polymers exhibit some degree of permeability to oxygen. The ability of oxygen to permeate through polymers such as PET into the interior of the container is a significant issue, particularly for foods and beverages that are degraded by the presence of even small amounts of oxygen. For the purpose of this disclosure, permeable means diffusion of small molecules through a polymeric matrix by migrating past individual polymer chains, and is distinct from leakage, which is transport through macroscopic or microscopic holes in a container structure.

Besides food and beverages, other products affected by oxygen include many drugs and pharmaceuticals, as well as a number of chemicals and even electronics. In order to package these oxygen-sensitive products, brand owners have historically relied on the use of glass or metal packaging. More recently, brand owners have begun to package their products in plastic packages which incorporate passive barriers to oxygen and/or oxygen scavengers. Generally, greater success has been achieved utilizing oxygen scavengers; however, oxygen scavenging materials heretofore have suffered from a number of issues. In particular, oxygen scavengers utilized to date rely on the incorporation of an oxidizable solid material into the package. Technologies utilized include oxidation of iron (incorporated either in sachets or in the container sidewall), oxidation of sodium bisulfite, or oxidation of an oxidizable polymer (particularly poly(butadiene) or m-xylylenediamine adipamide). All of these technologies suffer from slow rates of reaction, limited capacity, limited ability to trigger the scavenging reaction at the time of filling the container, haze formation in the package sidewall, and/or discoloration of the packaging material. These problems have limited the use of oxygen scavengers in general, and are especially significant for transparent plastic packaging (such as PET) and/or where recycling of the plastic is considered important.

Co-pending publication number WO2008/090354A1 discloses a container comprising an active substance which is incorporated in the container and is arranged to react with moisture in the container to release molecular hydrogen. The document describes a wide range of potential active substances including metals and/or hydrides. Potential hydrides are stated to be inorganic for example comprising a metal hydride or borohydride or they may be organic. In addition, the active substance could comprise a polymeric matrix, for example a polymeric silicon hydride. The document also states that the active material may be embedded in a polymeric matrix at a preferred level of 4-8 wt % of active substance. The specific examples in the document focus on use of sodium borohydride as the active material.

One problem associated with use of sodium borohydride is that its initial rate of production of hydrogen can be quite low. This may be disadvantageous since it would be preferable for initial hydrogen production to be at an enhanced rate thereby to scavenge headspace oxygen present in a container after initial filling of the container. The rate may then fall off and be sufficient to scavenge oxygen passing through walls of the container.

It has also been found that active substances described in WO2008/090354A, especially sodium borohydride, can react with aldehydes which are important flavour components of foods and beverages. An increased loss of these flavour components by reaction with the active substance may have a detrimental effect on the flavour of the food or beverage—i.e. the flavour is scalped and such scalping may get worse over time. In addition, boron compounds, unless suitably restrained, may migrate into foods or beverages. Such migration needs to be monitored in order to ensure compliance with any applicable regulatory limits applicable to boron compounds. Furthermore, it has been found that it may be difficult to incorporate some active substances such as sodium borohydride with certain polymers due to a reaction between the borohydride and the polymer.

It is an object of the present invention to address the above described problems.

SUMMARY OF INVENTION

According to a first aspect of the invention, there is provided a hydrogen-generating composition comprising calcium hydride associated with a matrix material.

DETAILED DESCRIPTION

Said calcium hydride may be embedded or preferably dispersed in said matrix material. Said matrix material may comprise a polymeric matrix material, selected based on the solubility of moisture in the bulk polymer and which is suitably chemically inert to the calcium hydride. Suitable matrix materials have a water vapour permeability of greater than 0.2 g·mm/m$^2$·day, suitably greater than 0.4 g·mm/m$^2$·day, preferably greater than 0.6 g·mm/m$^2$·day, more preferably greater than 0.8 g·mm/m$^2$·day, and especially greater than 1.0 g·mm/m$^2$·day. Said matrix material may comprise a blend comprising at least two polymeric materials.

The water vapour permeability of a matrix material in said composition may be less than 5 g·mm/m$^2$·day, less than 4 g·mm/m$^2$·day or less than 3 g·mm/m$^2$·day.

The matrix material in said composition preferably comprises an organic polymer. It may comprise a blend of more than one polymer. It preferably comprises, more preferably consists essentially of, a thermoplastic polymeric material.

Unless otherwise stated, water permeability described herein is measured using (American Society for Testing Materials Annual Book of Standards) ASTM procedure E96 Procedure E at 38° C. and relative humidity of 90%.

Suitable polymeric matrix materials include but are not limited to polyolefin homopolymers, random or block copolymers such as polyethylene and ethylene copolymers, polypropylene and propylene copolymers, butylene copolymers, ethylene vinyl acetate polymers and copolymers, styrene-ethylene-butylene-styrene copolymers, polystyrene and styrene polymers and copolymers, polyesters, for example terephthalates such as polybutylene terephthalate, polyurethanes, (meth)acrylic ester copolymers and nylon 6.

The particle size and particle size distribution described herein may be measured by methods such as those described in Size Measurement of Particles entry of Kirk-Othmer Encyclopedia of Chemical Technology, Vol. 22, 4$^{th}$ ed., (1997) pp. 256-278, incorporated herein by reference. For example, particle size and particle size distributions may be determined using a Fisher Subsieve Sizer or a Microtrac Particle-Size Analyzer manufactured by Leeds and Northrop Company, or by microscope techniques, such as scanning electron microscopy or transmission electron microscopy.

Calcium hydride of said composition may be in the form of a finely divided powder, preferably with a median particle size from about 0.5 µm to 500 µm, more preferably from about 1 µm to 300 µm and especially from about 3 µm to 200 µm. [As used herein, a $d_{50}$ particle size is the median diameter, where 50% of the volume is composed of particles larger than the stated $d_{50}$, and 50% of the volume is composed of particles smaller than the stated $d_{50}$ value. As used herein, the median particle size is the same as the $d_{50}$ particle size.]

To exercise additional control on the rate and release of hydrogen from the calcium hydride of said composition, it may be useful control to the particle size distribution of the calcium hydride particles.

A range of particle size distributions may be useful. The particle size distribution, as used herein, may be expressed by the "span (S)," where S is calculated by the following equation:

$$S = \frac{d_{90} - d_{10}}{d_{50}}$$

where $d_{90}$ represents a particle size diameter in which 90% of the volume is composed of particles having a diameter smaller than the stated $d_{90}$; and $d_{10}$ represents a particle size in which 10% of the volume is composed of particles having a diameter smaller than the stated $d_{10}$.

Particle size distributions of calcium hydride particles in which the span is less than 10, or less than 5 or less than 2 for example may be used. Alternatively, the particle size distribution (S) may range even broader, such as less than 15, less than 25 or less than 50.

Said calcium hydride is one active substance in said composition which is arranged to release molecular hydrogen as a result of contact with water. Said hydrogen generating composition may include calcium hydride and an additional active substance arranged to release molecular hydrogen as a result of contact with water. A said additional active substance may a metal or a hydride. It may be selected from sodium metal, lithium metal, potassium metal, sodium hydride, lithium hydride, potassium hydride, magnesium hydride, sodium borohydride and lithium aluminum hydride.

Calcium hydride suitably makes up at least 50 wt %, at least 60 wt %, at least 70 wt %, at least 80 wt % or at least 90 wt % of the total active substance(s) in said hydrogen-generating composition which are arranged to release molecular hydrogen as a result of contact with water. Preferably, calcium hydride represents more than 95 wt % or more than 98 wt % of the active substance(s) in said composition which are arranged to release molecular hydrogen as a result of contact with water. Preferably, calcium hydride is the only active substance in said composition which is arranged to release molecular hydrogen as a result of contact with water.

The total amount of active substances in said composition which are arranged to release molecular hydrogen on contact with water may be at least 1 wt %, preferably at least 2 wt %. The composition may include less than 70 wt % of said active substances. The composition may include 1-60 wt %, preferably 2-40 wt %, more preferably 4-30 wt % of said active substances.

In a preferred embodiment, the sum of the amount(s) of active substance(s) in said hydrogen composition which are arranged to release molecular hydrogen on contact with water is more than 16 wt % or more than 17 wt %. The sum of the amount(s) is preferably less than 50 wt %, less than 40 wt %, less than 30 wt % or less than 25 wt %.

In a preferred embodiment, said hydrogen-generating composition includes more than 16 wt % or more than 17 wt % of calcium hydride. Said composition may include 16.5-40 wt %, suitably 16.5 to 30 wt %, preferably 16.5 to 25 wt % of calcium hydride.

Said hydrogen-generating composition may include at least 60 wt %, suitably at least 70 wt %, preferably at least 75 wt % of matrix material, wherein the matrix material may comprise one or more organic polymers as described. Said composition may include less than 98 wt %, less than 95 wt %, less than 90 wt % or 83.5 wt % or less of matrix material.

In said composition, the sum of the amounts of matrix material and active substance(s) which are arranged to release molecular hydrogen on contact with water is suitably at least 85 wt %, preferably at least 90 wt %, more preferably at least 95 wt %, especially at least 98 wt %. The balance of material in the hydrogen generating composition may comprise additives to aid the compounding and effective dispersion of the calcium hydride in the matrix material, such as dispersants, surfactants, stabilizers and plasticizers. In addition, other conventional additives such as colorants (pigments and dyes), lubricants, and slip agents may be included in the hydrogen-generating composition to modify the physical and performance properties of the composition.

The sum of the amounts of matrix material and calcium hydride in said composition is suitably at least 85 wt %, preferably at least 90 wt %, more preferably at least 95 wt %, especially at least 98 wt %.

In said hydrogen-generating composition, a first ratio defined as the sum of the wt % of matrix material divided by the sum of the wt % of active substance(s) which is/are arranged to generate molecular hydrogen on contact with water is preferably at least 2, more preferably at least 3, especially at least 4. Said first ratio may be less than 20. Said first ratio may be in the range 2-16, preferably 3-12, more preferably 3-8, especially 3-6.

In said hydrogen generating composition, a second ratio defined as the sum of the wt % of matrix material divided by the wt % of calcium hydride is preferably at least 2, more preferably at least 3, especially at least 4. Said second ratio may be less than 20. Said second ratio may be in the range 2-16, preferably 3-12, more preferably 3-8, especially 3-6.

In a preferred embodiment, said hydrogen generating composition comprises 16.5-30 wt % of calcium hydride and 70-83.5 wt % of matrix material.

In some cases, said hydrogen-generating compositions may include a catalyst to facilitate a reaction between molecular hydrogen and molecular oxygen as hereinafter described. The catalyst may be incorporated in the matrix material The composition of the first aspect may be in the form of pellets or granules for use in making hydrogen-generating components. The composition may be in sheet form. The composition may be in the form of a component having a volume in the range 0.1 to 5 $cm^3$, suitably in the range 0.1 to 3 $cm^3$, preferably in the range 0.2 to 2 $cm^3$.

According to a second aspect of the invention, there is provided a method of making a composition according to the first aspect, the method comprising contacting calcium hydride and matrix material.

Calcium hydride could be pre-dispersed into a carrier medium prior to mixing with the matrix material to improve the dispersion of the particulate matter in the composition. A further advantage of incorporating the hydride into an inert carrier is that its reactivity decreases significantly. This is because the reactive particulates are surrounded by a hydrophobic carrier phase which slows down reaction with water (via atmospheric exposure or otherwise).

Suitable carriers include dry non-aqueous media that do not react with the hydride to release hydrogen and are liquid at room temperature. Examples include dried hydrocarbon-based mineral oils, silicone based oils, and alkyl terminated glycols (e.g. alkyl terminated PEG, PPG, THF). The carrier is preferably fully compatible with the final polymer matrix in order to fully disperse the hydride. The carrier may have a boiling point such that it can be removed during the compounding stage so as not to affect the properties of the final compound. The carrier may be a polymerisable monomer or oligomer which during the compounding stage undergoes polymerization and defines the polymeric matrix at least in part.

To improve the dispersion of calcium hydride throughout the matrix during compounding, it can be advantageous to use a suitable dispersant. Suitable dispersants should be effectively free of moisture and should not chemically react with calcium hydride to release hydrogen during the compounding process. Ideally, the dispersant molecule should contain a moiety capable of interacting or absorbing onto the calcium hydride particle surface and a moiety that is soluble in the polymer matrix. The dispersant molecule suitably does not include chemical groups that can react with calcium hydride to form hydrogen during compounding, for example, dispersants free of reactive carboxylic acid groups or reactive O—H bonds are preferred. Examples of suitable dispersants include, fatty acid esters of polyethylene glycol (PEG), polypropylene glycol (PPG), and dialkyl terminated PEG.

The dispersant can be present at a concentration of 0-10 wt % in a formulation compounded to produce the hydrogen-generating composition. The dispersant is suitably added to the carrier/particulate mix under high shear to ensure that primary particles are obtained.

When the hydrogen-generating composition includes a catalyst, the method may comprise incorporating the catalyst into the matrix material.

The large amount of inorganic particulate matter added to the matrix may alter the physical properties of the matrix. The inorganic filler may reinforce the matrix, making it stiffer, which may adversely impact on the ability of the material to form flexible sheet material. Therefore, a plasticizer may be added to the formulation compounded to produce the hydrogen-generating composition in order to improve the flexibility of the hydrogen-generating composition produced. A plasticizer is suitably non-reactive and contains no groups with OH bonds. Examples of common plasticizer that may be used include: adipate, phthalate, sebecate, maleates, benzoates, trimellitate. Epoxidised vegetable oils, polybutene, or other polymeric plasticizers may be used to prevent adverse reactions with hydride.

The method may comprise extruding or moulding the composition into a shape which can be incorporated into a packaging container. The composition may be molded (e.g. compression molded), stamped or laminated to another component of a packaging container, for example a closure device.

Prior to use in making a component for incorporating in a container, it is preferred to store the hydrogen-generating composition of the first aspect in an environment wherein moisture is restricted from reacting prematurely with the calcium hydride. Thus, in a third aspect, there is provided a package containing a hydrogen-generating composition according to the first aspect, wherein the package is arranged to restrict passage of moisture to the calcium hydride in the composition.

The package may include an inert gas or a mixture of an inert gas and hydrogen gas. Alternatively, the package may comprise essentially a vacuum in which the composition is arranged.

According to a fourth aspect of the invention, there is provided a container comprising a hydrogen generating means which comprises a hydrogen-generating composition according to the first aspect.

The hydrogen generating means may be arranged to slowly release molecular hydrogen inside the container over an extended period of time. In the presence of a suitable catalyst, the molecular hydrogen will react with any oxygen present in the interior of the container or in the container wall. Preferably, the rate of hydrogen release is tailored to match the rate of oxygen ingress into the container. In addition, it is preferable for there to be an initial relatively rapid release of hydrogen, followed by a slow continual release over a period of months or even years. Furthermore, it is preferred that substantial release of hydrogen reliably begins only when the package is filled. Finally, it is preferable that the substance releasing hydrogen does not adulterate the contents of the container.

The container suitably includes a catalyst for catalyzing a reaction between said molecular hydrogen and molecular oxygen. As a result, molecular oxygen in said container, for example which passes into said container through a wall thereof, may be scavenged, with water as a byproduct.

For purposes of this disclosure, a container includes any package that surrounds a product and that contains no intentional microscopic or macroscopic holes that provide for transport of small molecules between the interior and the exterior of the package. Said container optionally comprises a closure. For purposes of this disclosure, a catalyst includes any substance that catalyzes or promotes a reaction between molecular hydrogen and molecular oxygen.

The container may include a sidewall constructed from a composition that includes a polymer resin first component and a second component comprising a catalyst capable of catalyzing a reaction between molecular hydrogen and molecular oxygen. The hydrogen generating means is preferably located within the container or near an interior surface of the container. The hydrogen generating means is preferably located in or on a closure of said container.

The hydrogen generating means may be associated with a container in a variety of ways. Where a container includes a removable part, for example a closure, it may conveniently be associated with the closure. A closure may be releasably securable to a container body so that it can be removed and replaced, for example by being screw-threaded; or may be arranged to be removed but not replaced, for example by comprising a film which is adhered to a container body. In the latter case, the closure may comprise a film comprising a flexible "lidding" material as described hereinafter. In one embodiment, a container may include both a film closure which may provide an aseptic seal for the container and a releasably securable closure, both of which may independently include hydrogen generating means. After initial removal of both the releasably securable closure and the film closure, the releasably securable closure may be replaced and may generate hydrogen and therefore improve the storage life of the contents of the container.

When hydrogen generation occurs by reaction of the active substance with water, initiation of substantial hydrogen generation will occur only when the hydrogen generator is placed in a moisture-containing environment such as that found in most oxygen-sensitive foods and beverages. Thus initiation of hydrogen generation generally will coincide with the filling of the container and/or placement of the hydrogen generator into or near the interior of the container. In order to prevent or minimize hydrogen generation before this time, it is sufficient to minimize contact of the hydrogen generator with moisture. Unlike exclusion of molecular oxygen, exclusion of moisture is readily achieved by a number of methods, including but not limited to packaging the hydrogen generator and/or the structures containing the hydrogen generator in metal foil, metalized plastic, or polyolefin bags. For example, bulk packaging of closures containing hydrogen generating means in sealed polyethylene bags is an expedient way of limiting hydrogen generation prior to placement of the individual closures onto containers. Another method to limit contact of the hydrogen generator with moisture prior to placement of the individual closures onto containers is to place one or more desiccants inside the packaging with the closures.

Whilst in preferred embodiments, the source of moisture in the container for initiating hydrogen generation is a food or beverage contained within the container; other sources of moisture are contemplated. For example, a moisture generating means separate from the food or beverage may be associated with the container. Such a moisture generating means suitably comprises a high level of moisture. It may comprise a hydrogel which is associated with and/or is part of the container or another component within the container (e.g. a hydrated salt) which releases moisture on drying or in response to another stimulus, heating, exposure to visible or UV radiation, pressure change, microwave radiation, pH, electrical, magnetic field, ultrasound, etc.

Because once released the molecular hydrogen will rapidly disperse throughout the interior of the container and permeate through all permeable portions of the container walls, the location of the hydrogen generating means within the container is not critical. In general, however, it is desirable to locate the hydrogen generating means within the interior of the container in order to maximize the amount of hydrogen that is available for oxygen scavenging and minimize the amount of hydrogen generator required to obtain the desired degree of oxygen scavenging. Within the container, it is generally preferred to locate the hydrogen generating means in an opaque portion of the container. For example, in a beverage container made of transparent PET, location of the hydrogen generating means within the container closure is preferred. It is also generally preferred to locate the hydrogen generator behind a control means of a type described hereinafter.

In one embodiment, the hydrogen generating means may be incorporated in a film which is part of a container and is arranged to be removed (and suitably not replaced) to allow access to the contents of the container. The film may comprise a laminate. It may include a layer which is substantially impermeable to oxygen for example a metal layer such as an aluminum layer. The film may include a hydrogen generating layer which includes a said hydrogen generating means. The distance between the hydrogen generating layer and the contents of the container is preferably less than the distance between a said impermeable layer of the film and the contents of the container. The film may include a layer which defines a said control means, wherein the distance between the layer which defines a said control means and the contents of the container is less than the distance between the hydrogen generating layer and the contents of the container. The film may be a lidding foil which is adhered to a container body to define a container.

Because the generated hydrogen will permeate through the container walls, the amount of hydrogen present within the container at any time is minimal. Moreover, the faster hydrogen is generated the faster it will permeate; hence significant increases in the rate of hydrogen generation (from, for example, increased container storage temperatures) will result in only modest increases in the concentration of hydrogen within the container. Because the permeability of hydrogen through a polymer is much greater than the permeability of oxygen, the amount of hydrogen in the headspace of the container may not need to exceed 4 volume percent, which is below the flammability limit for hydrogen in air. Furthermore, the solubility of hydrogen in food or beverages is low; hence at any time most of the hydrogen in the container will be in the headspace of the container. Hence, the amount of hydrogen that may be present within a container may be very small. For example, for a 500 ml PET beverage container with a 30 milliliter headspace volume and a 0.05 cc/package-day $O_2$ ingress rate, less than about 1 cc of hydrogen is needed within the container in order for the rate of $H_2$ permeation to be greater than the rate of oxygen ingress. In addition, the rate of $H_2$ generation would need to be only about 0.1-0.2 cc/day in order for enough hydrogen to be generated on an ongoing basis to react with most or all of the ingressing oxygen.

Because only small amounts of hydrogen need to be present inside the container in order to achieve high levels of oxygen scavenging, expansion and contraction of the container over time from the presence (or loss) of hydrogen is minimal. Consequently this technology is readily applicable to both rigid and flexible containers.

In order to facilitate the reaction between molecular hydrogen with molecular oxygen, a catalyst is desired. A large number of catalysts are known to catalyze the reaction of hydrogen with oxygen, including many transition metals, metal borides (such as nickel boride), metal carbides (such as titanium carbide), metal nitrides (such as titanium nitride), and transition metal salts and complexes. Of these, Group VIII metals are particularly efficacious. Of the Group VIII metals, palladium and platinum are especially preferred because of their low toxicity and extreme efficiency in catalyzing the conversion of hydrogen and oxygen to water with little or no byproduct formation. The catalyst is preferably a redox catalyst.

In order to maximize the efficiency of the oxygen scavenging reaction, it is preferable to locate the catalyst where reaction with oxygen is desired. For example, if the application requires that oxygen be scavenged before it reaches the interior of the container, incorporation of the catalyst in the package sidewall is desirable. Conversely, if scavenging of oxygen already present in the container is desired, it is generally preferable to locate the catalyst near or in the interior of the container. Finally, if both functions are desired, catalyst may be located both in the interior of the container and in the container walls. While the catalyst may be directly dispersed into the food or beverage, it is generally preferable that the catalyst be dispersed into a polymeric matrix. Dispersion of the catalyst into a polymeric matrix provides several benefits, including but not limited to minimization of food or beverage adulteration, minimization of catalyzed reaction between molecular hydrogen and food or beverage ingredients, and ease of removal and/or recycling of the catalyst from the food or beverage container.

A particular advantage of the present invention is that because of the extremely high reaction rates obtainable with a number of catalysts, very small amounts of catalyst may be required. A container may include 0.01 ppm to 1000 ppm, suitably 0.01 ppm to 100 ppm, preferably 0.1 ppm to 10 ppm, more preferably at least 0.5 ppm of catalyst relative to the weight of said container (excluding any contents thereof). In preferred embodiments, 5 ppm or less of catalyst is included. Unless otherwise stated reference to "ppm" refer to parts per million parts by weight.

The small amount of catalyst needed allows even expensive catalysts to be economical. Moreover, because very small amounts are required to be effective, there can be minimal impact on other package properties, such as color, haze, and recyclability. For example, when palladium is utilized as the catalyst, concentrations less than about 5 ppm of finely dispersed Pd may be sufficient to achieve acceptable rates of oxygen scavenging. In general, the amount of catalyst required will depend on and can be determined from the intrinsic rate of catalysis, the particle size of the catalyst, the thickness of the container walls, the rates of oxygen and hydrogen permeation, and the degree of oxygen scavenging required.

In order to maximize the efficacy of the catalyst, it is preferred that the catalyst be well dispersed. The catalyst can be either homogenous or heterogeneous. For homogeneous catalysts it is preferred that the catalysts be dissolved in a polymer matrix at a molecular level. For heterogeneous catalysts, it is preferred that the average catalyst particle size be less than 1 micron, more preferred that average catalyst particle size be less than 100 nanometers, and especially preferred than the average catalyst particle size be less than 10 nanometers. For heterogeneous catalysts, the catalyst particles may be free-standing, or be dispersed onto a support material such as carbon, alumina, or other like materials.

The method of incorporation of the catalyst is not critical. Preferred techniques result in a well dispersed, active catalyst. The catalyst can be incorporated into the container at any time prior to, during, or after the introduction of the hydrogen source. The catalyst can be incorporated into a polymeric matrix during polymer formation or during subsequent melt-processing of the polymer. It can be incorporated by spraying a slurry or solution of the catalyst onto polymer pellets prior to melt processing. It can be incorporated by injection of a melt, solution, or suspension of the catalyst into pre-melted polymer. It may also be incorporated by making a masterbatch of the catalyst with polymer and then mixing the masterbatch pellets with polymer pellets at the desired level before injection molding or extrusion. In containers wherein the catalyst is located in the interior of the container, the catalyst may be co-mingled with the active substance in the matrix of the hydrogen generator.

In a preferred embodiment, the catalyst is incorporated into a wall of the container. It is preferably associated with, for example dispersed in, a polymer which defines at least part of the wall of the container. In a preferred embodiment, the catalyst is associated with material which defines at least 50%, preferably at least 75%, more preferably at least 90% of the area of the internal wall of the container.

In a preferred embodiment, the catalyst is distributed substantially throughout the entire wall area of a container, optionally excluding a closure thereof.

The containers contemplated in the present invention may be either of a monolayer or a multilayer construction. In a multi-layered construction, optionally one or more of the layers may be a barrier layer. A non-limiting example of materials which may be included in the composition of the barrier layer are polyethylene co-vinyl alcohols (EVOH), poly(glycolic acid), and poly(metaxylylenediamine adipamide). Other suitable materials which may be used as a layer or part of one or more layers in either monolayer or multilayer containers include polyester (including but not limited to PET), polyetheresters, polyesteramides, polyurethanes, polyimides, polyureas, polyamideimides, polyphenyleneoxide, phenoxy resins, epoxy resins, polyolefins (including but not limited to polypropylene and polyethylene), polyacrylates, polystyrene, polyvinyls (including but not limited to poly (vinyl chloride)) and combinations thereof. Furthermore glassy interior and/or exterior coatings ($SiO_x$, aluminum, $Al_2O_3$ or amorphous carbon) are explicitly contemplated as barrier layers. All of the aforementioned polymers may be in any desired combination thereof. Any and all of these materials may also comprise the container closure. In some cases, a container may comprise glass.

In a preferred embodiment, the container includes walls defined by polyester, for example PET and preferably catalyst is dispersed within the polyester.

The shape, construction, or application of the containers used in the present invention is not critical. In general, there is no limit to the size or shape of the containers. For example, the containers may be smaller than 1 milliliter or greater than 1000 liter capacity. The container preferably has a volume in the range 20 ml to 100 liter, more preferably 100 ml to 5 liter. Similarly, there is no particular limit to the thickness of the walls of the containers, the flexibility (or rigidity) of the containers, or the intended application of the containers. It is expressly contemplated that the containers include but are not limited to sachets, bottles, jars, bags, pouches, trays, pails, tubs, barrels, blister packs, or other like containers. Furthermore, the container may be located in the interior of another container, or have one of more containers located in the interior of the container. In preferred embodiments, the container may be any sealable container (plastic, glass, metal or hybrid construction) and may include sealable single and multilayer tray constructions (injection moulded or thermoformed), multi layer bags or pouches.

Said container may be arranged to protect an article from corrosion by scavenging oxygen within a container which contains an article susceptible to corrosion. The container may be used to protect sensitive electronic components or devices.

Said container may include a permeable wall comprising of one or more polymers that have in the absence of any oxygen scavenging a permeability between about $6.5 \times 10^{-7}$ $cm^3$-cm/($m^2$-atm-day) and about $1 \times 10^4$ $cm^3$-cm/($m^2$-atm-day).

It is generally desirable to tailor the length of time hydrogen will be released from the hydrogen generator to be similar to or greater than the desired shelf-life of the product that is to be protected from oxygen ingress. Tailoring the length of time hydrogen will be released can be done by adjusting properties of the control means and/or polymeric matrix. It is also desirable to tailor the rate of hydrogen generation to be equal to or somewhat greater than two times the rate of oxygen ingress, since the overall reaction is $2H_2 + O_2 \rightarrow 2H_2O$.

The hydrogen generating means is suitably arranged to generate hydrogen for an extended period of time, for example at least 100 days, preferably at least 180 days, more preferably at least 270 days, especially at least 365 days. The aforementioned periods may be assessed after storage at room temperature (22° C.) and ambient pressure.

It may also be preferred to scavenge oxygen that is initially present in the container or the food or beverage. To do so it is preferred that the hydrogen generator initially release hydrogen at an enhanced rate. In these instances, it is also preferred that a catalyst be located in or near the interior of the container.

The container may include a product, which suitably includes a source of moisture. The product may be for human consumption; it may be a food or beverage, the latter being especially preferred.

As referred to above, the container may include a control means for controlling passage of moisture from the container to the hydrogen generating means.

Said control means is preferably arranged to control passage of moisture suitably so as to reduce the rate of hydrogen generation by said hydrogen generating means compared to the rate in the absence of said control means. In this case, the control means suitably defines the rate determining step for passage of moisture to the active material of the hydrogen generating means, rather than the rate determining step being defined by other features of the hydrogen generating means, for example the properties of a matrix material hereinafter described with which the active material may be associated.

Providing a control means as described introduces substantial flexibility which allows control of the rate of production of hydrogen by the hydrogen generating means and tailoring of the time over which hydrogen is generated, which determines the shelf-life of the container. For example, to achieve a long shelf-life a relatively large amount of active material may be associated with a matrix and by controlling passage of moisture to the hydrogen generating means, the rate of hydrogen generation is controlled as is the rate of consumption of the active material. In contrast, in the absence of the control means, the relatively large amount of active material would produce hydrogen at a quicker rate and would be consumed quicker meaning the shelf-life of the container would be less.

Said control means may comprise a layer of material, for example polymeric material, having a water vapour permeability of less than 2.0 $g \cdot mm/m^2 \cdot day$, suitably less than 1.5 $g \cdot mm/m^2 \cdot day$, preferably less than 0.8 $g \cdot mm/m^2 \cdot day$, more preferably less than 0.4 $g \cdot mm/m^2 \cdot day$.

Said control means may comprise a layer or multiple layers of polymeric material selected from polyolefin homopolymers, random or block copolymers (e.g. HDPE, PP, LDPE,) PET, EVA, SEBS and Nylon (e.g. Nylon-6).

Said control means may comprise one or more layers of material, for example polymeric material, having a total thickness of at least 0.010 mm, preferably at least 0.025 mm, more preferably at least 0.045 mm. The thickness may be less than 0.5 mm, 0.2 mm or 0.1 mm.

Various means may be used to define control means for controlling passage of moisture. In one embodiment, said control means may comprise a layer of material (e.g. sheet material) which is suitably positioned between said hydrogen generating means and a source of moisture in the container. Said layer of material suitably comprises a polymeric material, as aforesaid. The layer may be adhered to the hydrogen-generating means or may contact it directly, for example by virtue of being co-extruded therewith.

The control means may have a thickness of at least 0.010 mm, preferably at least 0.025 mm, more preferably at least 0.045 mm. The thickness may be less than 0.5 mm, 0.2 mm or 0.1 mm.

The material, for example polymeric material of the control means is suitably permeable to hydrogen and water vapour. Preferably, it is impermeable to by-products of the hydrogen generating means which could migrate into the container.

According to a fifth aspect of the invention, there is provided a closure for a container, said closure comprising a hydrogen-generating composition according to the first aspect. The closure may include a control means as described herein.

According to a sixth aspect of the invention, provided the use of calcium hydride for generating a rapid initial hydrogen generation rate in a container in which a hydrogen-generating composition of the first aspect is incorporated.

Any feature of any aspect of any invention or embodiment described herein may be combined with any feature of any aspect of any other invention or embodiment described herein mutatis mutandis.

SPECIFIC EMBODIMENTS

Specific embodiments of the invention will now be described, by way of example, with reference to the accompanying drawings, in which.

The following materials are referred to hereinafter.

Ethylene vinyl acetate copolymer (15% vinylacetate content)—Elvax 550 supplied by DuPont.

Low density polyethylene (LDPE)—LD605BA supplied by ExxonMobil.

Styrene-ethylene-butylene-styrene block copolymer—Versaflex HCMT555 supplied by GLS Corporation.

Sodium Borohydride (Venpure SF) from Rohm & Hass.

Calcium hydride (purity 99%) from Sigma-Aldrich.

Figure 1:
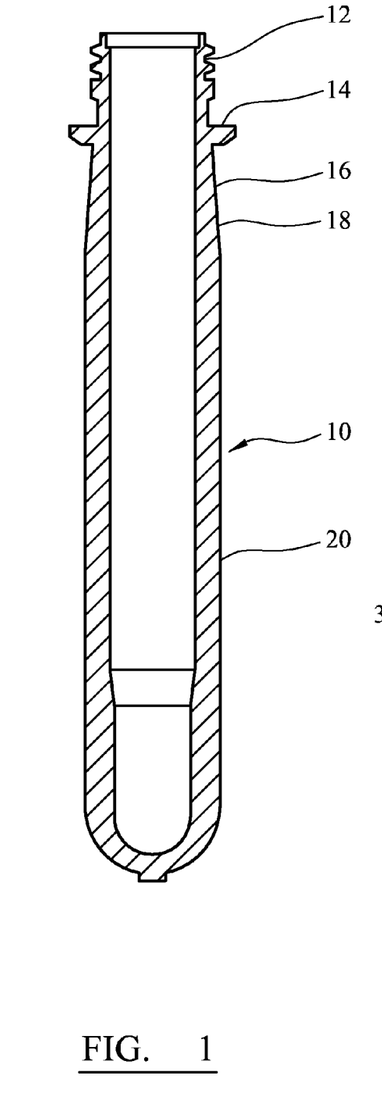
FIG. 1 is a cross-section through a preform.
Figure 2:
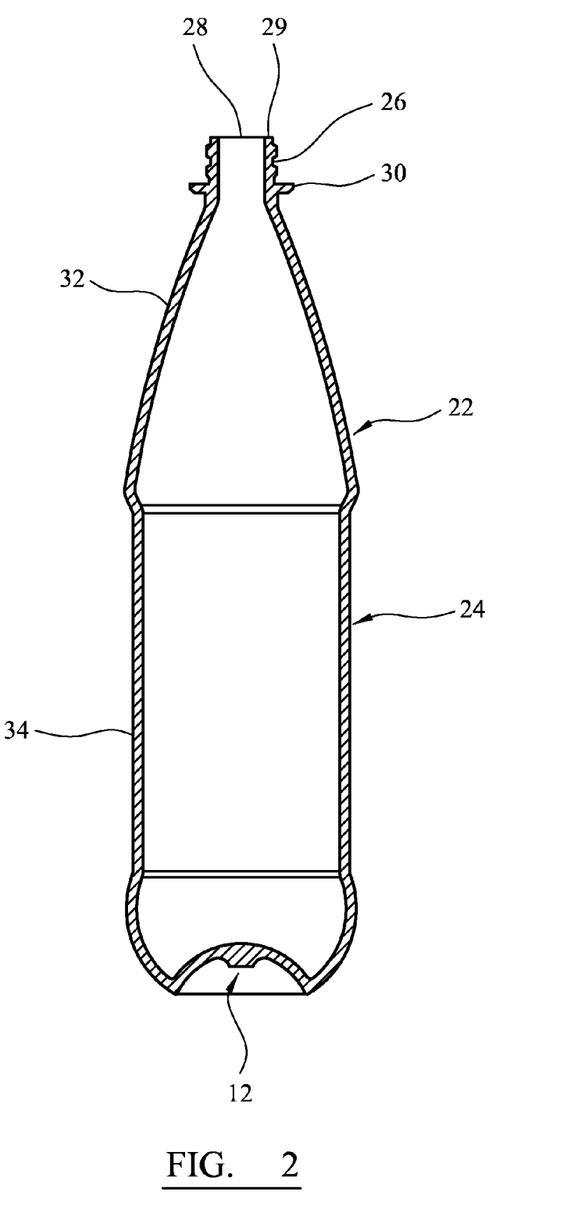
FIG. 2 is a cross-section through a bottle.
Figures 3, 4:
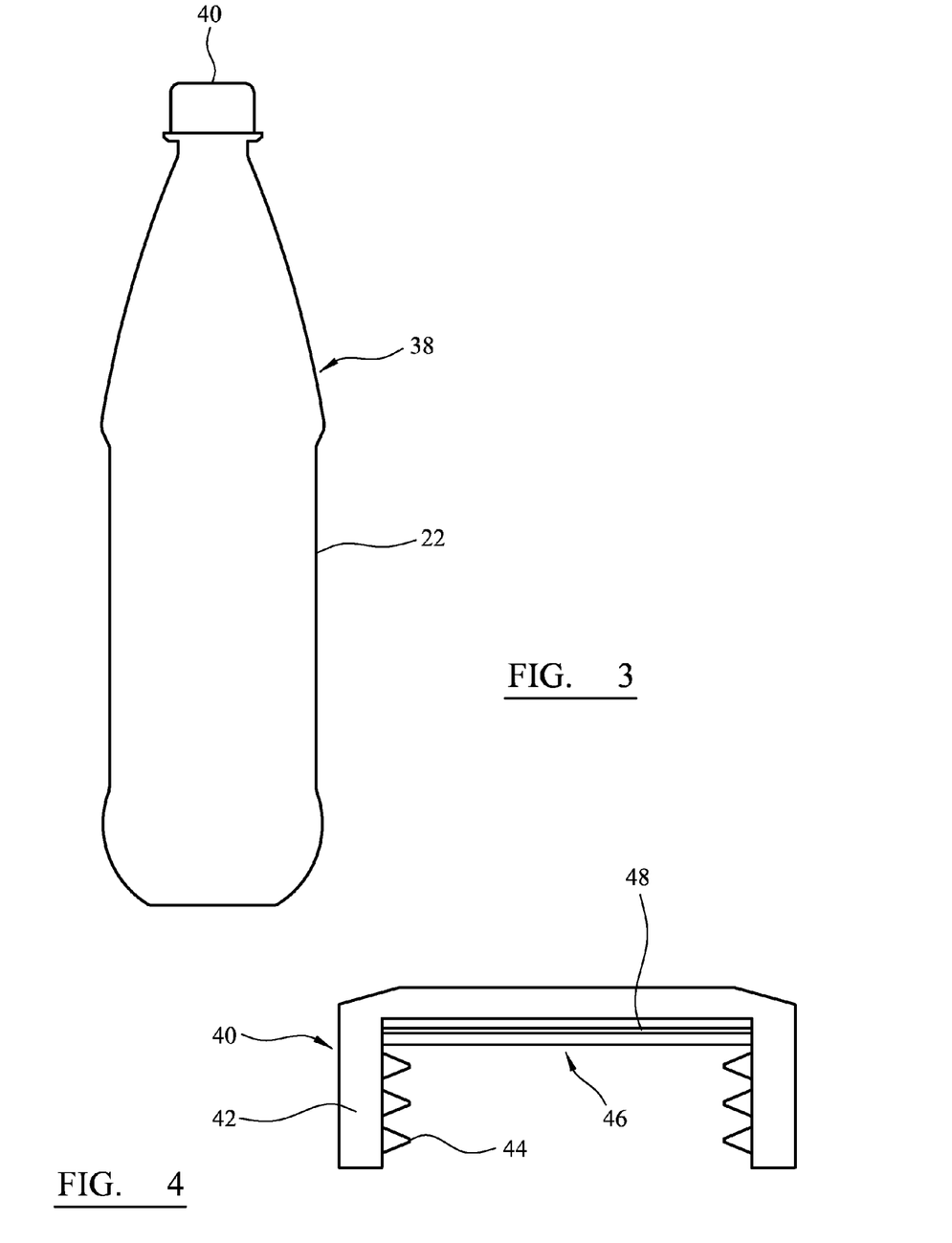
FIG. 3 is a side elevation of a bottle including a closure.
FIG. 4 is a closure, partly in cross-section.

A preform 10 illustrated in FIG. 1 can be blow molded to form a container 22 illustrated in FIG. 2. The container 22 comprises a shell 24 comprising a threaded neck finish 26 defining a mouth 28, a capping flange 30 below the threaded neck finish, a tapered section 32 extending from the capping flange, a body section 34 extending below the tapered section, and a base 36 at the bottom of the container. The container 10 is suitably used to make a packaged beverage 38, as illustrated in FIG. 3. The packaged beverage 38 includes a beverage. The beverage may be a carbonated beverage or non-carbonated beverage. Examples of suitable beverages include soda, beer, wine, fruit juices, tea and water. In one particular embodiment, the beverage is an oxygen sensitive beverage. In another embodiment, the beverage is a vitamin C containing beverage such as a vitamin C containing fruit juice, a beverage which has been fortified with vitamin C, or a combination of juices in which at least one of the juices includes vitamin C. In this embodiment, the beverage is disposed in the container 22 and a closure 40 seals the mouth 28 of container 22.

Referring to FIG. 4, a circular cross-section closure 40 includes a body 42 with a screw-threaded portion 44 for screw-threadedly engaging the closure with threaded neck finish 26. Inwards of the portion 44 is a liner 46 comprising a hydrogen generating device which incorporates calcium hydride. The liner 46 is disc-shaped and is a friction fit within the body 42 of the closure which has a corresponding circular cross-section. Thus, the liner 46 is superimposed upon the circular cross-section, and its entire periphery extends to and contacts the circumferential wall of an inner part of the body 42 so that it effectively fills the inner part.

As an alternative to it being a friction fit, the liner may be an inference fit within the body 42 and/or may be secured by adhesive or other means. If an adhesive is used, then there is no requirement for the liner to fill the inner part of the body 42.

The shell 24 of the container includes a catalyst. The catalyst may be dispersed in the polymer matrix, for example PET, which defines the shell 24 by injection molding polymeric matrix material and catalyst, for example a palladium compound, to define a preform 10 which is subsequently blow molded to define the container 22.

In use, with container 22 including a beverage and closure 40 in position, the headspace in the container will be saturated with water vapor. This vapor passes into liner 46 and contacts the calcium hydride associated with the liner. As a result, the calcium hydride produces molecular hydrogen which migrates into the polymer matrix of shell 24 and combines with oxygen which may have entered the container through its permeable walls. A reaction between the hydrogen and oxygen takes place, catalyzed by the catalyst, and water is produced. Thus, oxygen which may ingress the container is scavenged and the contents of the container are protected from oxidation. The scavenging effect may be maintained for as long as hydrogen is produced in the container and such time may be controlled by inter alia varying the amount of hydride in the liner.

As described above calcium hydride is used in the hydrogen generating device described herein. The examples hereinafter describe the preparation of compositions containing hydrides and compare features of calcium hydride with sodium borohydride (which is the focus of WO2008/090354).

Examples 1 to 6 describe the compounding of polymeric materials with hydrides; Example 7 describes preparation of plaques from compositions prepared; Example 8 describes an experiment to compare potential for flavour (e.g. acetaldehyde) scalping of compositions containing sodium borohydride or calcium hydride; and Example 9 describes experiments to compare hydrogen generating characteristics of compositions containing sodium borohydride or calcium hydride.

In the examples, the respective amounts of sodium borohydride and calcium hydride are selected so that compositions containing them are arranged to deliver the same molar quantities of hydrogen having regard to the molecular weights and formulae of the hydrides.

EXAMPLE 1

2 kg of sodium borohydride was compounded with 23 kg of Elvax 550 on a 24 mm Prism TSE 24HC twin screw extruder fitted with a die-face cutter. The feed zone of the extruder was kept under a nitrogen blanket. The feed zone temperature was set at 50° C. and the other 10 zones of the extruder were set at 130° C. The compound was pelletised and stored in a dry nitrogen atmosphere. 3 mm thick plaques (6×4 cm) were moulded from the sodium borohydride compound using a Boy 22M injection moulder machine at 190° C.

EXAMPLE 2

2 kg of sodium borohydride was compounded with 23 kg of Versaflex HCMT555 on a 24 mm Prism TSE 24HC twin screw extruder fitted with a die-face cutter. The feed zone of the extruder was kept under a nitrogen blanket. The feed zone temperature was set at 50° C. and the other 10 zones of the extruder were set at 130° C. The compound was pelletised and stored in a dry nitrogen atmosphere. 3 mm thick plaques (6×4 cm) were moulded from the sodium borohydride compound using a Boy 22M injection moulder machine at 200° C.

EXAMPLE 3

2 kg of sodium borohydride was compounded with 23 kg of LDPE (ExxonMobile LD605BA) on a 24 mm Prism TSE 24HC twin screw extruder fitted with a die-face cutter. The feed zone of the extruder was kept under a nitrogen blanket. The feed zone temperature was set at 50° C. and the other 10 zones of the extruder were set at 140° C. The compound was pelletised and stored in a dry nitrogen atmosphere. 3 mm thick plaques (6×4 cm) were moulded from the sodium borohydride compound using a Boy 22M injection moulder machine at 190° C.

EXAMPLE 4

2 kg of calcium hydride was compounded with 9.1 kg of Elvax 550 on a 24 mm Prism TSE 24HC twin screw extruder fitted with a die-face cutter. The feed zone of the extruder was kept under a nitrogen blanket. The feed zone temperature was set at 50° C. and the other 10 zones of the extruder were set at 130° C. The compound was pelletised and stored in a dry nitrogen atmosphere. 3 mm thick plaques (6×4 cm) were moulded from the calcium hydride compound using a Boy 22M injection moulder machine at 190° C.

EXAMPLE 5

2 kg of calcium hydride was compounded with 9.1 kg of Versaflex HCMT555 on a 24 mm Prism TSE 24HC twin screw extruder fitted with a die-face cutter. The feed zone of the extruder was kept under a nitrogen blanket. The feed zone temperature was set at 50° C. and the other 10 zones of the extruder were set at 130° C. The compound was pelletised and stored in a dry nitrogen atmosphere. 3 mm thick plaques (6×4 cm) were moulded from the calcium hydride compound using a Boy 22M injection moulder machine at 200° C.

EXAMPLE 6

2 kg of calcium hydride was compounded with 9.1 kg of LDPE (ExxonMobile LD605BA) on a 24 mm Prism TSE 24HC twin screw extruder fitted with a die-face cutter. The feed zone of the extruder was kept under a nitrogen blanket. The feed zone temperature was set at 50° C. and the other 10 zones of the extruder were set at 190° C. The compound was pelletised and stored in a dry nitrogen atmosphere. 3 mm thick plaques (6×6 cm) were moulded from the calcium hydride compound using a Boy 22M injection moulder machine at 190° C.

EXAMPLE 7

3 mm thick plaques were moulded from SEBS (Versaflex HCMT555) using a Boy 22M injection moulder machine at 200° C.

EXAMPLE 8

26 mm discs were cut from moulded plaques prepared in examples 2, 3, 5 and 7. Each disc was placed in a separate 200 ml glass bottle. Each bottle was sealed and the atmosphere within the bottle replaced with helium containing 25 ppm acetaldehyde (AA) by purging. A 2 ml sample of the gas from each bottle was removed and analysed by CG after 12 days and 21 days storage at room temperature. The remaining AA concentration express as percentage of the starting concentration for each example is shown in table 1.

TABLE 1

| Example | Compound | Hydride content (wt %) | Acetaldehyde (wt %) remaining after | |
|---|---|---|---|---|
| | | | 12 day | 21 days |
| 7 (control) | SEBS | 0 | 91 | 91 |
| 2 | NaBH$_4$/SEBS | 8 | 0 | 0 |
| 5 | CaH$_2$/SEBS | 18 | 18 | 14 |
| 3 | NaBH$_4$/LDPE | 8 | 27 | 8 |
| 6 | CaH$_2$/LDPE | 18 | 55 | 43 |

EXAMPLE 9

Rectangular strips (approximately 5 cm×1.5 cm) were cut from the moulded plaques prepared in Examples 1 to 6. Each sample was accurately weighed in grams to 2 decimal places. Each sample was wedged into the bottom of a 100 ml graduated, glass gas-burette which was inverted and placed into a water-filled one liter beaker. The burette was filled with water to just below the sample by inserting a 3 mm flexible polyethylene tube to the top of the burette and removing the air with a syringe attached to the other end of the polyethylene tube. The hydrogen produced was measured by noting the amount of water displaced from each tube over time. The hydrogen gas evolution results for examples 1 to 6, expressed as ml of gas per gram of sample (ml/g) are shown in table 2.

TABLE 2

| | | H$_2$ gas generation (ml/g) after x days | | | | | | | |
|---|---|---|---|---|---|---|---|---|---|
| Example | Compound | 5 | 10 | 20 | 30 | 40 | 50 | 60 | 70 |
| 1 | NaBH$_4$(8%)/EVA | 17 | 26 | 44 | 63 | 73 | 82 | 92 | 99 |
| 2 | NaBH$_4$(8%)/SEBS | 17 | 25 | 40 | 59 | 57 | 63 | 72 | 77 |
| 3 | NaBH$_4$(8%)/LDPE | 9 | 15 | 25 | 35 | 39 | 44 | 49 | 51 |
| 4 | CaH$_2$(18%)/EVA | 75 | 105 | 146 | 175 | 196 | 210 | 221 | 221 |
| 5 | CaH$_2$(18%)/SEBS | 65 | 100 | 150 | 183 | 209 | 225 | 232 | 232 |
| 6 | CaH$_2$(18%)/LDPE | 25 | 37 | 50 | 62 | 69 | 75 | 84 | 88 |

Referring to table 1, it should be noted that the example 2 (NaBH$_4$/SEBS) compound reduces the AA concentration within the bottle to zero after less than 10 days storage, whereas, changing the hydride in SEBS from NaBH$_4$ to CaH$_2$ (example 5) significantly retards the reduction in AA consumption—after 21 days storage the reduction in AA level approaches a lower limit of 14%. Example 6 show that switching to a CaH$_2$/LDPE compound retards the loss of AA further—after 21 days storage the lower limit of AA has increased further to 43%. These results illustrate that there is a very significant risk that any head space aldehydes (e.g. acetaldehyde) present in a container will be reacted away relatively quickly by sodium borohydride—containing compositions. If the product in the container is for example a fruit juice which generates significant quantities of head space aldehyde-based flavour components, such flavour components may be gradually removed by reaction with sodium borohydride which may detrimentally affect the flavour of the juice. This potential flavour scalping effect is much less likely when calcium hydride containing compositions are used instead of sodium borohydride.

Referring to table 2, the results clearly show hydrogen generation rates for the CaH$_2$ compounds are significantly higher than the analogous NaBH$_4$ compounds. For example, the CaH$_2$/EVA compound (example 2) generated 105 ml/g of hydrogen within 10 days, whereas the analogous NaBH$_4$/EVA compound (example 1) only generated 26 ml/g hydrogen after 10 days. Overall, these results show that the appropriate selection of the calcium hydride compound can significantly extend the scope for controlling the rate of hydrogen generation. For example, calcium hydride can be used to generate a very rapid initial hydrogen generation rate which can be used to rapidly scavenge the oxygen in the head space of a sealed container and hence stop the degradation of oxygen sensitive materials immediately.

It has also been found that sodium borohydride can react with some polymers, for example polymers with ester linkage, meaning that compositions of such polymers (e.g. acrylic acid or polyester polymers) cannot be used as hydrogen generating polymer compositions. In addition boron compounds that may be present as a result of the hydrogen generation reaction using sodium borohydride may need to be prevented from contacting a beverage in a container with which the borohydride is associated, due to regulatory limitations on consumer exposure to such compounds, whereas such limitations on by-products from calcium hydride are likely to be less restrictive.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A hydrogen-generating composition comprising calcium hydride associated with a matrix material, wherein the ratio defined as the sum of the wt % of the matrix material divided by the wt % of calcium hydride is at least 2, said calcium hydride makes up at least 50 wt % of total active substances in said hydrogen-generating composition which are arranged to release molecular hydrogen as a result of contact with water, and the total amount of said active substances in said composition which are arranged to release molecular hydrogen is more than 16 wt %.

2. A composition according to claim 1, wherein said calcium hydride is dispersed in said matrix material and said matrix material has a water vapour permeability of greater than 0.2 g·mm/m$^2$·day.

3. A composition according to claim 2, wherein said matrix material comprises a thermoplastic polymeric material and said matrix material has a water vapour permeability of less than 5 g·mm/m$^2$·day.

4. A composition according to claim 1, wherein said calcium hydride comprises a powder with a median particle size from about 0.5 μm to 500 μm.

5. A composition according to claim 1, which includes more than 16 wt % of calcium hydride.

6. A composition according to claim 1, which includes 16.5-40 wt % of calcium hydride.

7. A composition according to claim 1, which includes at least 60 wt % of organic polymers.

8. A composition according to claim 1, which includes 16.5-30 wt % of calcium hydride and 70-83.5 wt % of matrix material.

9. A composition according to claim 1, which is in the form of pellets or granules or is in sheet form.

10. A method of making a composition according to claim 1, the method comprising contacting calcium hydride and matrix material.

11. A method according to claim 10, wherein calcium hydride is pre-dispersed into a carrier medium prior to mixing with the matrix material.

12. A method according to claim 10, which comprises extruding or moulding the composition into a shape which can be incorporated into a packaging container.

13. A package containing a hydrogen-generating composition according to claim 1, wherein the package is arranged to restrict passage of moisture to the calcium hydride in the composition.

14. A container comprising a hydrogen-generating composition comprising calcium hydride associated with a matrix material, wherein said container contains a product which generates head space aldehyde-based flavor components; wherein in said hydrogen-generating composition the ratio defined as the sum of the wt % of the matrix material divided by the wt % of calcium hydride is at least 2, said calcium hydride makes up at least 50 wt % of total active substances in said hydrogen-generating composition which are arranged to release molecular hydrogen as a result of contact with water, and the total amount of said active substances in said composition which are arranged to release molecular hydrogen is more than 16 wt %.

15. A container according to claim 14, wherein said hydrogen-generating composition is associated with a closure of the container.

16. A container according to claim 14 which includes a control means for controlling passage of moisture to the hydrogen-generating composition, wherein said control means is arranged to control passage of moisture so as to reduce the rate of hydrogen generation by said hydrogen-generating composition compared to the rate in the absence of said control means.

17. A container according to claim 16, wherein said control means comprises a layer of material having a water vapour permeability of less than 2.0 g·m/m²·day.

18. A closure for a container, said closure comprising a hydrogen-generating composition according to claim 1.

19. A composition according to claim 3, wherein said composition includes from 16.5 to 40 wt % active substances which are arranged to release molecular hydrogen on contact with water.

20. A composition according to claim 19, wherein the sum of the amounts of matrix material and active substances which are arranged to release molecular hydrogen on contact with water is at least 85 wt %.

* * * * *